(12) United States Patent
Wang

(10) Patent No.: US 11,186,746 B2
(45) Date of Patent: Nov. 30, 2021

(54) POLYURETHANE PREPOLYMER WITH HIGH FUNCTIONALITY, METHOD OF PREPARING THE SAME, AND CURING AGENT COMPRISING THE SAME

(71) Applicant: NOVAMAT APPLIED MATERIAL CO., LTD., New Taipei (TW)

(72) Inventor: Hua Wang, Taoyuan (TW)

(73) Assignee: NOVAMAT APPLIED MATERIAL CO., LTD., New Taipei (TW)

( * ) Notice: Subject to any disclaimer, the term of this patent is extended or adjusted under 35 U.S.C. 154(b) by 118 days.

(21) Appl. No.: 16/704,763

(22) Filed: Dec. 5, 2019

(65) Prior Publication Data

US 2021/0115294 A1    Apr. 22, 2021

(30) Foreign Application Priority Data

Oct. 18, 2019    (TW) .................................. 108137725

(51) Int. Cl.
| | | |
|---|---|---|
| *C08G 18/12* | (2006.01) | |
| *C08G 18/18* | (2006.01) | |
| *C09D 175/14* | (2006.01) | |
| *C08G 18/75* | (2006.01) | |
| *C08G 18/32* | (2006.01) | |
| *C08G 18/62* | (2006.01) | |
| *C08G 18/76* | (2006.01) | |
| *C08G 18/73* | (2006.01) | |
| *C08G 18/24* | (2006.01) | |
| *C08G 18/48* | (2006.01) | |

(52) U.S. Cl.
CPC ........... *C09D 175/14* (2013.01); *C08G 18/12* (2013.01); *C08G 18/1825* (2013.01); *C08G 18/1875* (2013.01); *C08G 18/246* (2013.01); *C08G 18/3206* (2013.01); *C08G 18/4812* (2013.01); *C08G 18/6241* (2013.01); *C08G 18/73* (2013.01); *C08G 18/753* (2013.01); *C08G 18/7621* (2013.01)

(58) Field of Classification Search
CPC   C08G 18/12; C08G 18/1825; C08G 18/1875; C08G 18/3206; C08G 18/4812; C08G 18/73; C08G 18/753; C08G 18/7621
See application file for complete search history.

(56) References Cited

U.S. PATENT DOCUMENTS

| | | | | |
|---|---|---|---|---|
| 4,079,028 | A * | 3/1978 | Emmons ................ | A01N 25/10 524/507 |
| 4,670,068 | A * | 6/1987 | Chi ......................... | C06B 45/10 149/19.4 |
| 5,115,071 | A * | 5/1992 | Quay ..................... | C08G 18/10 528/59 |
| 7,339,020 | B2 | 3/2008 | Bruchmann et al. | |
| 9,550,857 | B2 | 1/2017 | Elizalde et al. | |
| 2002/0007036 | A1* | 1/2002 | Bruchmann ....... | C08G 18/8022 528/59 |
| 2007/0270543 | A1* | 11/2007 | Wagner ................ | C08G 18/755 524/590 |

FOREIGN PATENT DOCUMENTS

CN          103180403          6/2013

* cited by examiner

*Primary Examiner* — Michael L Leonard
(74) *Attorney, Agent, or Firm* — WPAT, PC

(57) ABSTRACT

Provided are a method of preparing a polyurethane prepolymer with high functionality and the polyurethane prepolymer with high functionality prepared therefrom and a curing agent comprising the same. The method includes the steps of: Step (A): providing an alcohol composition comprising a first polyol having 2 or 3 OH groups and a second polyol having 4 or more OH groups; Step (B): reacting the alcohol composition with a polyisocyanate to undergo a first polymerization, so as to obtain an intermediate; wherein a molar ratio of a total number of the OH groups of the alcohol composition to a total number of NCO groups of the polyisocyanate is from 1:2 to 1:6; and Step (C): adding a catalyst to carry out a second polymerization of the intermediate to obtain the polyurethane prepolymer with high functionality, which has four or more NCO groups.

13 Claims, No Drawings

POLYURETHANE PREPOLYMER WITH HIGH FUNCTIONALITY, METHOD OF PREPARING THE SAME, AND CURING AGENT COMPRISING THE SAME

CROSS-REFERENCE TO RELATED APPLICATION

The present invention claims the priority of Taiwan Patent Application No. 108137725 filed on Oct. 18, 2019, which is incorporated by reference in the present application in its entirety.

BACKGROUND OF THE INVENTION

1. Field of the Invention

The present invention relates to a polyurethane prepolymer and a method of preparing the same, and more particularly to a polyurethane prepolymer with high functionality which can be used as a curing agent.

2. Description of Related Art

Curing agent is a kind of chemical material widely used in fields such as coatings, plastics, inks and adhesives, and it is often combined with a compound or oligomer containing a reactive functional group to formulate a resin composition. In the resin composition, the curing agent reacts with foresaid compound or oligomer to form a polymer and then to obtain a product having a certain mechanical strength and stability. Since the type and the number of the functional group of the curing agent have a significant influence on the reaction rate of the resin composition and the characteristics of the product obtained therefrom, the related art requires a continuous development of different types of curing agents to meet the needs for different products. Among a variety of curing agents, polyurethane prepolymer, which can be curable at room temperature, becomes a common choice of curing agent.

In current technology, a stoichiometric excess of the diisocyanate monomers is usually utilized to react with a diol to form a polyurethane prepolymer. The use of such an excess of diisocyanate monomers results in an undesirable amount of unreacted, free diisocyanate monomers in the manufacturing process or the final products. However, various diisocyanates, such as toluene diisocyanate, may cause allergies, asthma, and even cancer. Therefore, how to reduce the volatile amount of the residual free diisocyanate monomers has become one of the main research interests in today's society, which is increasingly thinking highly of industrial safety.

To solve the above problems, several techniques have been described in the art. For example, a method of using the diisocyanate monomers with a lower vapor pressure can reduce the volatile amount of residual free diisocyanate monomers in the product, thereby alleviating the hazard to human health. However, the method will result in limited choice of curing agents, which is not conducive to satisfying the desired characteristics of various products. Another method which includes a diisocyanate converted into a form of dimer or a trimer is proposed, but there is still some problem in the final product such as insufficient mechanical strength owing to the low functionality of foresaid dimer of trimer.

SUMMARY OF THE INVENTION

To overcome the shortcomings, an objective of the present invention is to provide a method of preparing a polyurethane prepolymer with high functionality. Since the polyurethane prepolymer obtained by said method has a functionality of more than 3, it can be applied to a resin composition which forms a highly cross-linked three-dimensional network, thereby improving crosslinking density and obtaining good mechanical properties.

Another objective of the present invention is to provide a method of preparing a polyurethane prepolymer with high functionality. Said method is simple and cost-effective, thereby having a potential for commercial implementation.

Another objective of the present invention is to provide a method of preparing a polyurethane prepolymer with high functionality. A resin composition including the polyurethane prepolymer produced from said method can be cured to form a coating layer with good mechanical properties such as high hardness and a good chemical resistance.

Another objective of the present invention is to provide a method of preparing a polyurethane prepolymer with high functionality. The polyurethane prepolymer produced therefrom has a low content of free polyisocyanate monomers, thereby meeting the requirements of industrial safety.

To achieve the foresaid objectives, the present invention provides a method of preparing a polyurethane prepolymer with high functionality, which includes Steps (A) to (C). In Step (A), an alcohol composition comprising a first polyol and a second polyol is provided; wherein the first polyol has two or three hydroxy (OH) groups, and the second polyol has four or more OH groups. In Step (B), the alcohol composition is reacted with a polyisocyanate to undergo a first polymerization, so as to obtain an intermediate; wherein a molar ratio of a total number of the OH groups of the alcohol composition to a total number of isocyanate (NCO) groups of the polyisocyanate is from 1:2 to 1:6. In Step (C), a catalyst is added to carry out a second polymerization of the intermediate, so as to obtain the polyurethane prepolymer with high functionality. The polyurethane prepolymer with high functionality produced therefrom has four or more NCO groups.

Comprising the first polyol with a fewer number of OH groups which is conducive to dissolving the second polyol with a more number of OH groups, the alcohol composition would be easy to subsequently react with the polyisocyanate. Moreover, in the step (B), since the total numbers of the NCO groups of the reactants are more than twice the total numbers of the OH groups of the reactants, only one of the NCO groups of the polyisocyanate participates the first polymerization. Accordingly, the intermediate with urethane groups obtained from the addition polymerization has multiple NCO ends, and the intermediate also has a smaller molecular weight and a lower viscosity. Then, the intermediate is subjected to a self polymerization (i.e. the second polymerization) by adding the catalyst, and finally the polyurethane prepolymer with high functionality can be obtained. The polyurethane prepolymer with high functionality can have 4 or more NCO groups such as 4, 5, or 6, and a molecular weight distribution thereof is relatively uniform. On one hand, because the polyurethane prepolymer has multiple NCO groups, it can enhance the overall crosslinking density when applied to a resin composition, thereby improving the mechanical properties of the final product. On the other hand, the free polyisocyanate monomers will be exhausted during the second polymerization, and thus the content of the free polyisocyanate monomers will be reduced in the polyurethane prepolymer.

In accordance with the present invention, the first polyol may act as a solvent for the second polyol; therefore, the melting temperature of the second polyol would be lower, and the self-crosslinking of the second polyol would be avoided. In order to make the alcohol composition mixed more uniformly, preferably, a molar ratio of the first polyol to the second polyol ranges from 1:1 to 6:1.

In addition, the mixing temperature of the alcohol composition may be adjusted to enhance the mixing effect. Preferably, the alcohol composition may be heated to a temperature of from 55° C. to 160° C. in Step (A). In some embodiments, the first polyol and the second polyol may be mixed to form the alcohol composition at the temperature of from 55° C. to 80° C., and then the alcohol composition is heated to 100° C. to 160° C., and was kept at the temperature 1 hour to 3 hours to make the alcohol composition under a dehydration. In another embodiments, the first polyol and the second polyol may be mixed to form the alcohol composition at the temperature of from 85° C. to 130° C. and then the alcohol composition will proceed with a dehydration. In accordance with the present invention, the first polyol comprises an aliphatic diol having a molecular weight from 60 to 300 or an aliphatic triol having a molecular weight from 60 to 300, but it is not limited thereto. For example, the aliphatic diol comprises 2-methyl-1,3-propanediol, [4-(hydroxymethyl)cyclohexyl]methanol, 2,2-dimethyl-1,3-propanediol (NPG), 1,3-propanediol, 1,4-butanediol, 1,5-pentanediol, 1,6-hexanediol, 3-methyl-1,5-pentanediol, 2-butyl-2-ethyl-1,3-propanediol (BEPD), or 1,3-dihydroxy-2,2,4-trimethyl pentane (TMPD glycol), but it is not limited thereto. The aliphatic triol comprises propane-1,2,3-triol or trimethylolpropane (TMP), but it is not limited thereto. When the aforementioned aliphatic diol or aliphatic triol is used in the method of the present invention, the obtained polyurethane prepolymer as a curing agent can make the resulting coating layer have an advantage of being less yellowish.

Preferably, the second polyol has 4 to 6 OH groups; specifically, the second polyol comprises pentaerythritol or dipentaerythritol (DPE), but it is not limited thereto.

In order to make the first polymerization react more completely, preferably, Step (B) further comprises Steps (B1) and (B2). In Step (B1), the polyisocyanate and an ester solvent can be mixed to obtain a solution comprising the polyisocyanate; wherein a temperature of Step (B1) ranges from 40° C. to 70° C. In Step (B2), the alcohol composition and the solution comprising the polyisocyanate may be mixed, and then the alcohol composition may be reacted with the polyisocyanate to undergo the first polymerization, so as to obtain the intermediate; wherein a reaction temperature of Step (B2) ranges from 65° C. to 85° C.

Preferably, Step (B1) may be carried out under a nitrogen atmosphere. Preferably, in the step (B2), the dehydrated alcohol composition may be added dropwise to the solution comprising the polyisocyanate to undergo the first polymerization.

In accordance with the present invention, the polyisocyanate may be an aliphatic polyisocyanate having 4 to 20 carbon atoms or an aromatic polyisocyanate having 4 to 20 carbon atoms. Preferably, the polyisocyanate comprises diisocyanate or triisocyanate, but it is not limited thereto. For example, the aliphatic polyisocyanate may be hexamethylene diisocyanate (HDI), trimethylhexamethylene diisocyanate (TMDI), 5-isocyanato-1-(isocyanatomethyl)-1,3,3-trimethylcyclohexane (IPDI), hydrogenated m-xylylene diisocyanate (H6XDI), or 4,4'-diisocyanato-methylenedicyclohexane (HMDI), but it is not limited thereto. The aromatic polyisocyanate may be toluene diisocyanate (TDI), methylene diphenyl diisocyanate (MDI), or m-xylylene diisocyanate, but it is not limited thereto. In some embodiments, the polyisocyanate may comprise a combination of two kinds of the polyisocyanate such as a combination of 2,4-TDI and 2,6-TDI, a combination of IPDI and HDI, or a combination of HDI and TDI, but it is not limited thereto. Preferably, in the combination of 2,4-TDI and 2,6-TDI, 2,4-TDI ranges from 30 wt % to 80 wt % based on the total weight of the combination.

Preferably, the ester solvent may be ethyl acetate, 1-propyl acetate, isopropyl ethanoate, 1-butyl acetate, isobutyl acetate, 2-ethoxyethyl acetate, or 1-methoxy-2-propyl acetate (PMA), but it is not limited thereto.

Preferably, the molar ratio of the total number of the OH groups of the alcohol composition to the total number of NCO groups of the polyisocyanate ranges from 1:3 to 1:5.

In order to further remove unreacted free polyisocyanate monomers, preferably, Step (C) further comprises Steps (C1) and (C2). In Step (C1), the catalyst is added to carry out the second polymerization of the intermediate to obtain a crude product; wherein a temperature of Step (C1) ranges from 60° C. to 90° C. In Step (C2), the crude product is purified to obtain the polyurethane prepolymer with high functionality. In the crude product, a content of free polyisocyanate monomers ranges from 0.5% to 2.0% by weight based on the total weight of the crude product, but it is not limited thereto.

In accordance with the present invention, the catalyst may be tributylphosphane, tributyltin-oxide, titanium(IV) butoxide, a tertiary amine such as triethylenediamine, lead naphthenate, stannous 2-ethylhexanoate, 2,4,6-tris(dimethylaminomethyl)phenol, or a tetrabutylammonium salt such as tetrabutylammonium hydroxide (TBAH), but it is not limited thereto. Preferably, the catalyst in Step (C) is added in an amount of from 0.02 parts to 0.2 parts by weight based on 100 parts by weight of the polyisocyanate in Step (B1).

In some embodiments, while the second polymerization has proceeded for a period of time, a terminator may be added in the later period of the second polymerization in Step (C1). Specifically, the terminator may be triphenyl phosphite, dimethyl sulfate (DMS), 4-methylbenzenesulfonic acid (TsOH), benzoyl chloride, or phosphoric acid, but it is not limited thereto. While the second polymerization has been carried out for a period of time, an NCO content (NCO value) of the product obtained therefrom may be detected. Preferably, when the detected NCO value is from 6 wt % to 25 wt %, the terminator could be added. The aforementioned NCO value means the weight percentage of the isocyanate group of the product to the total weight of the product. Preferably, the terminator in Step (C1) is added in an amount of from 30 parts to 80 parts by weight based on 100 parts by weight of the catalyst in Step (C1).

In accordance with the present invention, the process of purification carried out in Step (C2) may be carried out by a thin film evaporator, a distillation technique, a solvent extraction method, or a molecular sieve, but it is not limited thereto. Preferably, the process of purification may be carried out by a two-stage thin film evaporator; wherein a separating temperature ranges from 110° C. to 130° C. and a degree of vacuum ranges from 1000 Pa to 3000 Pa at the primary stage; and a separating temperature ranges from 165° C. to 180° C. and a degree of vacuum ranges from 80 Pa to 200 Pa at the secondary stage. The purification carried out by the two-stage thin film evaporator can reduce side reactions that occur during the separation process and remove the free polyisocyanate monomers more thoroughly.

Moreover, the present invention also provides a polyurethane prepolymer with high functionality prepared from the above method. The polyurethane prepolymer with high functionality has four or more NCO groups. Preferably, based on a total weight of the polyurethane prepolymer with high functionality, a content of free polyisocyanate monomers ranges from 0% to 1.0% by weight; more preferably, the content of free polyisocyanate monomers ranges from 0% to 0.5% by weight.

Preferably, the polyurethane prepolymer with high functionality has a weight-average molecular weight (Mw) from 1000 to 3000, but it is not limited thereto. When the Mw of the polyurethane prepolymer with high functionality falls within foresaid range, the curing agent containing the same can have a more moderate viscosity, which is advantageous for subsequent applications.

Preferably, the polyurethane prepolymer with high functionality has an NCO content from 6% to 25% by weight based on the weight of the polyurethane prepolymer with high functionality; more preferably, the polyurethane prepolymer with high functionality has the NCO content from 8 wt % to 20 wt %.

The present invention also provides a curing agent comprising the above polyurethane prepolymer with high functionality.

In accordance with the present invention, for the convenience of subsequent application, the polyurethane prepolymer with high functionality can be combined with a suitable solvent to form a curing agent, and a solid content of the curing agent can be adjusted to satisfy the needs; accordingly, the resulting curing agent may have a moderate viscosity. For example, the solvent may be ethyl acetate, 1-propyl acetate, isopropyl ethanoate, 1-butyl acetate, isobutyl acetate, or 1-methoxy-2-propyl acetate, but it is not limited thereto. Preferably, based on a total weight of the curing agent, the solid content (i.e. the weight of the polyurethane prepolymer with high functionality) ranges from 30 wt % to 80 wt %; more preferably, based on the total weight of the curing agent, the solid content ranges from 40 wt % to 75 wt %. Preferably, a viscosity of the curing agent ranges from 1000 cps to 5000 cps.

Specifically, the above curing agent comprising the polyurethane prepolymer with high functionality and a resin having OH groups can be incorporated into a resin composition. A product formed by the resin composition can have excellent mechanical properties such as high hardness, a good chemical resistance such as high gasoline resistance, high reliabilities such as a good light resistance and a high temperature and humidity resistance because the resin composition comprises the foresaid curing agent. Specifically, the resin having OH groups may be an acrylic resin having OH groups or a polyester resin having OH groups, but it is not limited thereto. Preferably, the resin composition may be a coating composition.

DETAILED DESCRIPTION OF THE PREFERRED EMBODIMENT

Hereinafter, one skilled in the arts can easily realize the advantages and effects of a method of preparing the polyurethane prepolymer with high functionality, the obtained polyurethane prepolymer with high functionality, and the curing agent comprising the same in accordance with the present invention from the following examples. It should be understood that the descriptions proposed herein are just preferable examples for the purpose of illustrations, not intended to limit the scope of the invention. Various modifications and variations could be made in order to practice or apply the present invention without departing from the spirit and scope of the invention.

Analysis:

NCO value of each of the Examples of the polyurethan prepolymer and the solid content and the viscosity of the curing agent comprising the same were respectively measured by the following methods.

1. NCO value analysis: measured in accordance with the standard method ASTM D2369-81.
2. Solid content: measured in accordance with the standard method ISO 14896-2006.
3. Viscosity: measured in accordance with the standard method ASTM D1665-98.

Example 1

First, TMP was heated to 70° C. and melted, and then DPE was added into the melted TMP to form an alcohol composition. Next, the alcohol composition was heated to 120° C. and was kept at the temperature for 2 hours to obtain a dehydrated alcohol composition; wherein a molar ratio of TMP to DPE was 6:1 in the alcohol composition.

Under nitrogen atmosphere, 1-butyl acetate and the polyisocyanate were mixed in a reactor to form a solution comprising the polyisocyanate; then, the solution comprising the polyisocyanate was heated to 50° C. The polyisocyanate comprised 2,4-TDI and 2,6-TDI, and 2,4-TDI was in 69 wt % based on the total weight of the polyisocyanate.

Next, the dehydrated alcohol composition was added dropwise into the reactor for 1 hour, and the temperature of the addition was kept at between 66° C. and 78° C. The alcohol composition and the solution comprising the polyisocyanate were mixed well and underwent a first polymerization to obtain an intermediate; wherein a molar ratio of a total number of the OH groups of the alcohol composition to a total number of NCO groups of the polyisocyanate was 1:4. After the addition was finished, the reactor was kept at 70° C. for 1 hour; then, the reactor was heated to 80° C. and kept at the temperature for 1 hour again. Next, 2,4,6-tris(dimethylaminomethyl)phenol as the catalyst was added into the reactor in an amount of 0.05 parts by weight based on 100 parts by weight of the polyisocyanate at one time, and then the intermediate was subjected to a second polymerization under the presence of the catalyst. After the second polymerization had proceeded for 2 hours, the liquid reaction mixture in the reactor was sampled for the analysis of NCO value. The measured NCO value was from 13 wt % to 14 wt %. Subsequently, benzoyl chloride was added into the reactor in an amount of 40 parts by weight based on the 100 parts by weight of the catalyst, and then they continued reacting until one hour later. After the completion of the reaction, the crude product was obtained.

The crude product was fed into a two-stage thin film evaporator to process purification at a feed rate of 2 kg/min, and then the solvent and free polyisocyanate monomers were removed. The setting parameters of the two-stage thin film evaporator were as follows: a separating temperature was 120° C. and a degree of vacuum was 2000 Pa at the primary stage; and a separating temperature was 180° C. and a degree of vacuum was 200 Pa at the secondary stage. After the completion of the purification, Polyurethane prepolymer with high functionality 1 was obtained, which had a Mw of 1500±200 and a NCO value of 13.5 wt %.

Finally, Polyurethane prepolymer with high functionality 1 and 1-butyl acetate were mixed to obtain Curing agent 1. The solid content of Curing agent 1 was adjusted to 50±1 wt %, and the viscosity of Curing agent 1 was 2000 cps to 2400 cps.

Example 2

First, TMP and DPE were mixed to form an alcohol composition. Next, the alcohol composition was heated to 120° C. and was kept at the temperature 1.5 hours to obtain a dehydrated alcohol composition; wherein a molar ratio of TMP to DPE was 4:1 in the alcohol composition.

Under nitrogen atmosphere, 1-butyl acetate and the polyisocyanate were mixed in a reactor to form a solution comprising the polyisocyanate; then, the solution comprising the polyisocyanate was heated to 50° C. The polyisocyanate comprised 2,4-TDI and 2,6-TDI, and 2,4-TDI was in 73 wt % based on the total weight of the polyisocyanate.

Next, the dehydrated alcohol composition was added dropwise into the reactor for 1 hour, and the temperature of the addition was kept at between 66° C. and 78° C. The alcohol composition and the solution comprising the polyisocyanate were mixed well and underwent a first polymerization to obtain an intermediate; wherein a molar ratio of a total number of the OH groups of the alcohol composition to a total number of NCO groups of the polyisocyanate was 1:4. After the addition was finished, the reactor was kept at 70° C. 1 hour; then, the reactor was heated to 80° C. and kept at 80° C. for 1 hour again. Next, TBAH as the catalyst was added into the reactor in an amount of 0.05 parts by weight based on 100 parts by weight of the polyisocyanate at one time, and then the intermediate was subjected to a second polymerization under the presence of the catalyst. After the second polymerization had proceeded for 3 hours, the liquid reaction mixture in the reactor was sampled for the analysis of NCO value. The measured NCO value was from 11.5 wt % to 12.5 wt %. Subsequently, phosphoric acid was added into the reactor in an amount of 60 parts by weight based on the 100 parts by weight of the catalyst, and then they continued reacting until one hour later. After the completion of the reaction, the crude product was obtained.

The crude product was fed into a two-stage thin film evaporator to process purification at a feed rate of 2 kg/min, and then the solvent and free polyisocyanate monomers were removed. The setting parameters of the two-stage thin film evaporator were as follows: a separating temperature was 120° C. and a degree of vacuum was 2000 Pa at the primary stage; and a separating temperature was 180° C. and a degree of vacuum was 200 Pa at the secondary stage. After the completion of the purification, Polyurethane prepolymer with high functionality 2 was obtained, which had a Mw of 1400±200 and had a NCO value of 12.0 wt %.

Finally, Polyurethane prepolymer with high functionality 2 and 1-butyl acetate were mixed to obtain Curing agent 2. The solid content of Curing agent 2 was adjusted to 50±1 wt %, and the viscosity of Curing agent 2 was 1800 cps to 2200 cps.

Example 3

First, TMP and DPE were mixed to form an alcohol composition. Next, the alcohol composition was heated to 120° C. and was kept at the temperature for 2.5 hours to obtain a dehydrated alcohol composition; wherein a molar ratio of TMP to DPE was 2:1 in the alcohol composition.

Under nitrogen atmosphere, 1-butyl acetate and the polyisocyanate were mixed in a reactor to form a solution comprising the polyisocyanate, and then heated to 65° C. The polyisocyanate comprised 2,4-TDI and 2,6-TDI, and 2,4-TDI was in 59 wt % based on the total weight of the polyisocyanate.

Next, the dehydrated alcohol composition was added dropwise into the reactor for 1.5 hours, and the temperature of the addition was kept at between 66° C. and 78° C. The alcohol composition and the solution comprising the polyisocyanate were mixed well and underwent a first polymerization to obtain an intermediate; wherein a molar ratio of a total number of the OH groups of the alcohol composition to a total number of NCO groups of the polyisocyanate was 1:4. After the addition was finished, the reactor was kept at 70° C. for 1 hour; then, the reactor was heated to 80° C. and kept at 80° C. for 1 hour again. Next, triethylenediamine as the catalyst was added into the reactor in an amount of 0.02 parts by weight based on 100 parts by weight of the polyisocyanate at one time, and then the intermediate was subjected to a second polymerization under the presence of the catalyst. After the second polymerization had proceeded for 2.5 hours, the liquid reaction mixture in the reactor was sampled for the analysis of NCO value. The measured NCO value was from 9.5 wt % to 10.5 wt %. Subsequently, triphenyl phosphite was added into the reactor in an amount of 80 parts by weight based on the 100 parts by weight of the catalyst, and then they continued reacting until one hour later. After the completion of the reaction, the crude product was obtained.

The crude product was fed into a two-stage thin film evaporator to process purification at a feed rate of 2 kg/min, and then the solvent and free polyisocyanate monomers were removed. The setting parameters of the two-stage thin film evaporator were as follows: a separating temperature was 120° C. and a degree of vacuum was 2000 Pa at the primary stage; and a separating temperature was 180° C. and a degree of vacuum was 200 Pa at the secondary stage. After the completion of the purification, Polyurethane prepolymer with high functionality 3 was obtained, which had a Mw of 1200±200 and a NCO value of 10.0 wt %.

Finally, Polyurethane prepolymer with high functionality 3 and PMA were mixed to obtain Curing agent 3. The solid content of Curing agent 3 was adjusted to 50±1 wt %, and the viscosity of Curing agent 3 was 1500 cps to 1900 cps.

Example 4

First, TMP and DPE were mixed to form an alcohol composition. Next, the alcohol composition was heated to 120° C. and was kept at the temperature for 2.5 hours to obtain a dehydrated alcohol composition; wherein a molar ratio of TMP to DPE was 4:1 in the alcohol composition.

Under nitrogen atmosphere, 1-butyl acetate and HDI were mixed in a reactor to form a solution comprising the polyisocyanate; then, the solution comprising the polyisocyanate was heated to 60° C.

Next, the dehydrated alcohol composition was added dropwise into the reactor for 1.5 hours, and the temperature of the addition was kept at between 66° C. and 78° C. The alcohol composition and the solution comprising the polyisocyanate were mixed well and underwent a first polymerization to obtain an intermediate; wherein a molar ratio of a total number of the OH groups of the alcohol composition to a total number of NCO groups of the polyisocyanate (i.e. HDI) was 1:4. After the addition was finished, the reactor was kept at 60° C. 4 hours. Next, a complex catalyst was added into the reactor at one time; wherein the complex catalyst was composed of a tertiary amine (trade name: DABCO TMR) in an amount of 0.05 parts by weight and 2,4,6-tris(dimethylaminomethyl)phenol (trade name: DABCOTMR-30) in an amount of 0.025 parts by weight based on 100 parts by weight of the polyisocyanate, and then the intermediate was heated to 70° C. and was subjected to a second polymerization under the presence of the catalyst. After the second polymerization had proceeded for 4 hours, the liquid reaction mixture in the reactor was sampled for the analysis of NCO value. The measured NCO value was from 16 wt % to 17 wt %. Subsequently, phosphoric acid was added into the reactor in an amount of 40 parts by weight based on the 100 parts by weight of the complex catalyst, and then they continued reacting until one hour later. After the completion of the reaction, the crude product was obtained.

The crude product was fed into a two-stage thin film evaporator to process purification at a feed rate of 2 kg/min, and then the solvent and free polyisocyanate monomers were removed. The setting parameters of the two-stage thin film evaporator were as follows: a separating temperature was 120° C. and a degree of vacuum was 2000 Pa at the primary stage; and a separating temperature was 180° C. and a degree of vacuum was 200 Pa at the secondary stage. After the completion of the purification, Polyurethane prepolymer with high functionality 4 was obtained, which had a Mw of 1200±200 and had a NCO value of 16.5 wt %.

Finally, Polyurethane prepolymer with high functionality 4 and 1-butyl acetate were mixed to obtain Curing agent 4. The solid content of Curing agent 4 was adjusted to 75±1 wt %, and the viscosity of Curing agent 4 was 1000 cps to 1200 cps.

Example 5

First, TMP and DPE were mixed to form an alcohol composition. Next, the alcohol composition was heated to 120° C. and was kept at the temperature for 2.5 hours to obtain a dehydrated alcohol composition; wherein a molar ratio of TMP to DPE was 4:1 in the alcohol composition.

Under nitrogen atmosphere, 1-butyl acetate and IPDI were mixed in a reactor to form a solution comprising the polyisocyanate; then, the solution comprising the polyisocyanate was heated to 60° C.

Next, the dehydrated alcohol composition was added dropwise into the reactor for 1.5 hours, and the temperature of the addition was kept at between 66° C. and 78° C. The alcohol composition and the solution comprising the polyisocyanate were mixed well and underwent a first polymerization to obtain an intermediate; wherein a molar ratio of a total number of the OH groups of the alcohol composition to a total number of NCO groups of the polyisocyanate (i.e. IPDI) was 1:4. After the addition was finished, the reactor was kept at 60° C. for 4 hours. Next, a complex catalyst was added into the reactor at one time; wherein the complex catalyst was composed of a tertiary amine (trade name: DABCO TMR) in an amount of 0.05 parts by weight and 2,4,6-tris(dimethylaminomethyl)phenol (trade name: DABCOTMR-30) in an amount of 0.05 parts by weight based on 100 parts by weight of the polyisocyanate, and then the intermediate was heated to 70° C. and was subjected to a second polymerization under the presence of the catalyst. After the second polymerization had proceeded for 4 hours, the liquid reaction mixture in the reactor was sampled for the analysis of NCO value. The measured NCO value was from 12 wt % to 13 wt %. Subsequently, phosphoric acid was added into the reactor in an amount of 30 parts by weight based on the 100 parts by weight of the complex catalyst, and then they continued reacting until one hour later. After the completion of the reaction, the crude product was obtained.

The crude product was fed into a two-stage thin film evaporator to process purification at a feed rate of 2 kg/min, and then the solvent and free polyisocyanate monomers were removed. The setting parameters of the two-stage thin film evaporator were as follows: a separating temperature was 120° C. and a degree of vacuum was 2000 Pa at the primary stage; and a separating temperature was 180° C. and a degree of vacuum was 200 Pa at the secondary stage. After the completion of the purification, Polyurethane prepolymer with high functionality 5 was obtained, which had a Mw of 1600±100 and a NCO value of 12.0 wt %.

Finally, Polyurethane prepolymer with high functionality 5 and 1-butyl acetate were mixed to obtain Curing agent 5. The solid content of Curing agent 5 was adjusted to 60±1 wt %, and the viscosity of Curing agent 5 was 1600 cps to 1800 cps.

Comparative Example 1

DPE was used alone to react with a polyisocyanate. However, when DPE was heated to 200° C., DPE did not melt but rather even have undergone a self-gelation. Thus, DPE could not react with the polyisocyanate alone, so a polyurethane prepolymer with high functionality could not be obtained.

Preparation for Coating Compositions Comprising the Curing Agent

Curing agent 1 to Curing agent 5 obtained from Examples 1 to 5, Commercial curing agent 1 (trade name: Bayer L75, TDI-TMP adduct) and Commercial curing agent 2 (trade name: Bayer N3300, HDI trimer) were respectively mixed with a varnish formula to obtain Coating compositions A to G. The varnish formula comprised 60 wt % of a hydroxy acrylic resin, 15 wt % of 1-butyl acetate, 15 wt % of ethyl acetate, 7.6 wt % of PMA, 1.8 wt % of a dibutyltin dilaurate (DBTDL) reagent which contained 10% DBTDL, 0.1 wt % of a leveling additive (trade name: TEGO GLIDE 450) and 0.5 wt % of a flowing agent (trade name: TEGO FLOW 300) based on a total weight of the varnish formula; wherein the total weight of the OH groups of the hydroxy acrylic resin was in 3.0 wt % based on the total weight of the hydroxy acrylic resin.

The above varnish formula and the respective curing agents were mixed according to the content ratios shown in Table 1, and then they were stirred uniformly to obtain Coating compositions A to G. The NCO value of the polyurethane prepolymer in each curing agent was also listed in Table 1.

Next, Coating compositions A to G were flashed off at 25° C. for 5 minutes and then dried at 60° C. for 4 hours to form cured coating layers with an average thickness of about 20 μm to 25 μm.

TABLE 1

No. of Coating composition, No. or trade name of Curing agent, NCO value of the polyurethane prepolymer in Curing agent, and the content of Curing agent in Coating composition

| No. of Coating composition | No. or trade name of Curing agent | NCO value of the polyurethane prepolymer in Curing agent | Content of Curing agent in Coating composition (wt %) |
| --- | --- | --- | --- |
| A | 1 | 13.5 wt % | 36.60 |
| B | 2 | 12.0 wt % | 41.18 |
| C | 3 | 10.0 wt % | 49.41 |
| D | 4 | 16.5 wt % | 29.95 |
| E | 5 | 12.0 wt % | 39.53 |

TABLE 1-continued

No. of Coating composition, No. or trade name of Curing agent,
NCO value of the polyurethane prepolymer in Curing agent,
and the content of Curing agent in Coating composition

| No. of Coating composition | No. or trade name of Curing agent | NCO value of the polyurethane prepolymer in Curing agent | Content of Curing agent in Coating composition (wt %) |
|---|---|---|---|
| F | Bayer L75 | 13.3 wt % | 37.15 |
| G | Bayer N3300 | 21.6 wt % | 22.88 |

Characteristic Analysis of Coating Compositions A to G

In order to ensure the experimental significance of the characteristic analysis, Coating compositions A to G were each respectively cured to form a coating layer in the same manner from the corresponding coating compositions, and the obtained coating layers were each analyzed by the same test method. Therefore, it can be understood that the difference in characteristics of each of the coating layers therefrom was mainly caused by the difference in the curing agents of the coating compositions.

The tests were conducted to analyze characteristics of the coating layers respectively obtained from Coating compositions A to G comprising Curing agents 1 to 5, the commercial aromatic polyisocyanate-based curing agent (Bayer L75) and the commercial aliphatic polyisocyanate-based curing agent (Bayer N3300) in sequence. The characteristics were adhesion, hardness, gasoline resistance, high temperature and humidity resistance, and light resistance, and the analysis results were shown in Table 2.

Test Method:

1. Adhesion: The adhesion of the coating layer to the substrate was evaluated in accordance with ASTM D3359 "Standard Test Method for Adhesion by Tape." Each coating layer was divided through the bottom by a cross-cut tester into 100 small lattices of 1 mm$^2$, and a prescribed pressure-sensitive tape (3M #610) was applied over the 100 small lattices and then removed by pulling up at an angle of 45°. The adhesion was then evaluated by comparison. If the edge of the cutting line was extremely smooth and the lattices of the coating layer did not have any detachment, it was rated 5B; if there was a small piece of coating layer detached at the cutting line intersection, but the detached area was less than 5%, it was rated 4B; that is, the smaller the rank value, the worse the adhesion.

2. Hardness: A pencil hardness tester (brand: Mitsubishi pencil) was applied to each coating layer under a load of 500 g by scratching three times until any superficial trace was left or destruction was caused. Then, the maximum hardness that did not destruct the surface was recorded as the hardness of the coating layer.

3. Gasoline resistance: A gauze soaking in 95 gasoline was applied to rub the coating layer 500 times at a frequency of 60 times per minute under the load of 500 g and in the test length of 3 cm, and then the coating layer was to observe whether the substrate was revealed or not.

4. High temperature and humidity resistance: in the first stage, the coating layer was placed in a constant humidity incubator with a humidity of 95% and a temperature of 65° C. for 120 hours, and the appearance of the coating layer was observed whether abnormal or not; in the second stage, the coating layer after experiencing the high temperature and high humidity environment was placed at room temperature for 6 hours, and the adhesion of said coating layer was then evaluated by the adhesion test described above.

5. Light resistance: the coating layer placed in an environment at 60° C. was irradiated with a UV aging lamp with UVB-313 nm, and an intensity of the UV was 0.71 W/m$^2$. After irradiating for 100 hours, said coating layer was observed if said coating layer was cracked, and the color difference (ΔE*) was recorded.

TABLE 2 analysis results of characteristics of the coating layer formed
from Coating compositions A to G comprising Curing agents 1 to 5

| No. of Coating composition | Adhesion | Hardness | Gasoline resistance | High temperature and humidity resistance | Light resistance/ ΔE* |
|---|---|---|---|---|---|
| A | 5B | 3H | Non-revealing the substrate | Normal appearance/ 5B | Non-cracked/ 4.2 |
| B | 5B | 3H | Non-revealing the substrate | Normal appearance/ 5B | Non-cracked/ 4.0 |
| C | 5B | 3H | Non-revealing the substrate | Normal appearance/ 5B | Non-cracked/ 4.1 |
| F | 5B | 2H | Revealing the substrate | — | Non-cracked/ 4.5 |
| D | 5B | 2H | Non-revealing the substrate | Normal appearance/ 5B | Non-cracked/ 1.12 |
| E | 5B | 3H | Non-revealing the substrate | Normal appearance/ 5B | Non-cracked/ 0.96 |
| G | 5B | H | Revealing the substrate | — | Non-cracked/ 1.54 |

Discussion of the Results

As shown in Table 2, from the analysis results of the aromatic polyisocyanate-based curing agents, compared to the coating layer formed from Coating composition F, all of the coating layers formed respectively from Coating compositions A to C had higher hardness because Coating compositions A to C included Curing agents 1 to 3 which comprised Polyurethane prepolymers with high functionality 1 to 3. Similarly, from the analysis results of the aliphatic polyisocyanate-based curing agents, compared to the coating layer formed from Coating composition G, both of the coating layers formed respectively from Coating compositions D and E also had higher hardness because Coating compositions D and E included Curing agents 4 and 5 which comprised Polyurethane prepolymers with high functionality 4 and 5. It illustrates that the use of the curing agent of the present invention indeed results in better mechanical properties for the resulting coating layer.

Further, as shown in Table 2, from the analysis results of the aromatic polyisocyanate-based curing agents, compared to the coating layer formed from Coating composition F, all of the coating layers formed respectively from Coating compositions A to C had a better gasoline resistance because Coating compositions A to C included Curing agents 1 to 3 which comprised Polyurethane prepolymers with high functionality 1 to 3. Similarly, from the analysis results of the aliphatic polyisocyanate-based curing agents, compared to the coating layer formed from Coating composition G, both of the coating layers formed respectively from Coating compositions D and E also had a better gasoline resistance because Coating compositions D and E included Curing agents 4 and 5 which comprised Polyurethane prepolymers with high functionality 4 and 5. It illustrates that the use of the curing agent of the present invention indeed results in a better chemical resistance such as gasoline resistance for the resulting coating layer.

Moreover, as shown in Table 2, from the analysis results of the aromatic polyisocyanate-based curing agents, compared to the coating layer formed from Coating composition F, all of the coating layers formed respectively from Coating compositions A to C had a smaller ΔE* because Coating compositions A to C included Curing agents 1 to 3 which comprised Polyurethane prepolymers with high functionality 1 to 3. That is, all of the coating layers formed respectively from Coating compositions A to C had a more excellent light resistance. Similarly, from the analysis results of the aliphatic polyisocyanate-based curing agents, compared to the coating layer formed from Coating composition G, both of the coating layers formed respectively from Coating compositions D and E also had a more excellent light resistance because Coating compositions D and E included Curing agents 4 and 5 which comprised Polyurethane prepolymers with high functionality 4 and 5. Besides, all of the coating layers formed respectively from Coating compositions A to E had a good high temperature and humidity resistance. It demonstrates that the use of the curing agent of the present invention indeed results in higher reliabilities for the resulting coating layer.

Based on the above analysis results, by including the curing agent which comprises the polyurethane prepolymer with high functionality of the present invention in the coating composition, the coating layer formed therefrom can have improved mechanical properties, chemical resistance, and/or light resistance, thus enhancing the application value of the coating composition and the coating layer manufactured therefrom.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method of preparing a polyurethane prepolymer with high functionality, comprising steps of:
   Step (A): providing an alcohol composition comprising a first polyol and a second polyol; wherein the first polyol has two or three OH groups, and the second polyol has four or more OH groups; wherein the second polyol comprises dipentaerythritol;
   Step (B): reacting the alcohol composition with a polyisocyanate to undergo a first polymerization, so as to obtain an intermediate; wherein a molar ratio of a total number of the OH groups of the alcohol composition to a total number of NCO groups of the polyisocyanate is from 1:2 to 1:6; and
   Step (C): adding a catalyst to carry out a second polymerization of the intermediate, so as to obtain the polyurethane prepolymer with high functionality; wherein the polyurethane prepolymer with high functionality has six or more NCO groups.

2. The method of claim 1, wherein a molar ratio of the first polyol to the second polyol ranges from 1:1 to 6:1.

3. The method of claim 2, wherein the alcohol composition is heated to a temperature of from 55° C. to 160° C. in Step (A).

4. The method of claim 1, wherein Step (B) further comprises:
   Step (B1): mixing the polyisocyanate and an ester solvent to obtain a solution comprising the polyisocyanate; wherein a temperature of Step (B1) ranges from 40° C. to 70° C.; and
   Step (B2): mixing the alcohol composition and the solution comprising the polyisocyanate to undergo the first polymerization, so as to obtain the intermediate; wherein a reaction temperature of Step (B2) ranges from 65° C. to 85° C.

5. The method of claim 1, wherein Step (C) further comprises:
   Step (C1): adding the catalyst to carry out the second polymerization of the intermediate to obtain a crude product; wherein a temperature of Step (C1) ranges from 60° C. to 90° C.; and
   Step (C2): purifying the crude product to obtain the polyurethane prepolymer with high functionality.

6. The method of claim 1, wherein the polyisocyanate has 4 to 20 carbon atoms.

7. The method of claim 1, wherein the polyisocyanate comprises hexamethylene diisocyanate, trimethylhexamethylene diisocyanate, 5-isocyanato-1-(isocyanatomethyl)-1,3,3-trimethylcyclohexane, hydrogenated m-xylylene diisocyanate, 4,4'-diisocyanato-methylenedicyclohexane, toluene diisocyanate, methylene diphenyl diisocyanate, or m-xylylene diisocyanate.

8. The method of claim 1, wherein the first polyol comprises an aliphatic diol having a molecular weight from 60 to 300 or an aliphatic triol having a molecular weight from 60 to 300.

9. The method of claim 1, wherein the first polyol comprises 2-methyl-1,3-propanediol, [4-(hydroxymethyl)cyclohexyl]methanol, 2,2-dimethyl-1,3-propanediol, 1,3-propanediol, 1,4-butanediol, 1,5-pentanediol, 1,6-hexanediol, 3-methyl-1,5-pentanediol, 2-butyl-2-ethyl-1,3-propanediol, 1,3-dihydroxy-2,2,4-trimethyl pentane, propane-1,2,3-triol, or trimethylolpropane.

10. A polyurethane prepolymer with high functionality prepared from the method of claim 1, wherein the polyurethane prepolymer with high functionality has six or more NCO groups.

11. The polyurethane prepolymer with high functionality of claim 10, comprising an NCO content from 6% to 25% by weight based on the polyurethane prepolymer with high functionality.

12. The polyurethane prepolymer with high functionality of claim 11, having a weight-average molecular weight from 1000 to 3000.

13. A curing agent comprising the polyurethane prepolymer with high functionality of claim 10.

* * * * *